United States Patent [19]
Lietz et al.

[11] Patent Number: 5,496,525
[45] Date of Patent: Mar. 5, 1996

[54] EROSION RESISTANT, CERAMIC FIBER LINING

[75] Inventors: Arthur A. Lietz, Oakhurst; John R. Peterson, Randolph, both of N.J.; Paul E. Schlett, Schenectady, N.Y.

[73] Assignee: Exxon Research and Engineering Company, Florham Park, N.J.

[21] Appl. No.: 569,053

[22] Filed: Aug. 17, 1990

Related U.S. Application Data

[63] Continuation-in-part of Ser. No. 240,294, Sep. 6, 1988, abandoned.

[51] Int. Cl.⁶ ..................................................... B01J 19/00
[52] U.S. Cl. ........................... 422/241; 422/240; 428/299
[58] Field of Search ......................... 422/240, 241; 428/34.5, 298, 299, 301, 302

[56] References Cited

U.S. PATENT DOCUMENTS

| | | | |
|---|---|---|---|
| 2,982,623 | 5/1961 | Johnson | 422/241 |
| 3,449,084 | 6/1969 | Smoot et al. | 422/241 |
| 3,861,881 | 1/1975 | Nowak | 422/180 |
| 4,269,887 | 5/1981 | Sonobe et al. | 428/299 |
| 4,418,650 | 12/1983 | Johnson et al. | 165/104.16 |
| 4,490,333 | 12/1984 | Peterson | 422/241 |
| 4,530,722 | 7/1985 | Moore et al. | 106/38.35 |

FOREIGN PATENT DOCUMENTS 759015 10/1956 United Kingdom ................... 428/302

Primary Examiner—Lyle A. Alexander
Attorney, Agent, or Firm—Joseph J. Dvorak

[57] ABSTRACT

Simply stated, the present invention contemplates the use of a ceramic fiber insulation material which is impregnated with an agent capable of stiffening the blanket and reducing erosion of the insulation material under conditions of use.

9 Claims, 1 Drawing Sheet

EROSION RESISTANT, CERAMIC FIBER LINING

CROSS REFERENCE TO RELATED APPLICATIONS

This application is a Continuation-in-Part of U.S. application Ser. No. 240,294, filed Sep. 6, 1988 now abandoned.

FIELD OF THE INVENTION

The invention relates to improvements in the internal insulation of vessels.

BACKGROUND OF THE INVENTION

In processes in which gas suspended solids such as catalyst or coke are contacted or reacted in metal vessels at relatively high temperature conditions, it is conventional to line the interior of the vessel with a suitable refractory material to insulate the metal wall of the vessel from the process temperatures as well as to protect the metal wall from the corrosive and erosive effects of the material being processed within the vessel.

There are several conventional methods for installing insulating linings in such "cold wall" reactor vessels. One method is to secure a pre-cast or molded refractory brick lining to the vessel internal wall by metal anchors, adhesives or the like. Another method is to cast or gun a castable refractory lining in place inside the vessel.

None of these methods has proved entirely satisfactory for a number of reasons. Thermal stresses often result in cracking of the lining and its separation from the wall during thermal cycling of the reactor with the concomitant loss of heat from the vessel and access of the hot gases and erosive solids to the vessel wall. As a consequence, the lining requires repair which is costly in terms of material labor, and also in terms of loss of production from downtime of the reaction vessel.

Consequently, numerous attempts have been made to improve on the method of installing refractory linings in vessels requiring them. For example, in U.S. Pat. No. 2,398,546 there is disclosed a vessel lining system which consists of a refractory lining which is spaced from the vessel wall. A particulate refractory material is included within the space between the wall and the lining, serving to insulate and minimize contact of the wall by erosive solids.

In U.S. Pat. No. 2,982,623, a monolithic thermal insulating lining for a vessel is disclosed which includes a metal grid spaced from the vessel wall by studs. The metal grid has two castable layers applied to it. The first layer is a low density, high insulating castable refractory. A second layer contains an abrasion resistant castable. It is included to protect the refractory layer from erosion.

U.S. Pat. No. 4,490,333 discloses a dual insulating layer in a reactor vessel using a ceramic anchor to fasten the second refractory layer to a previously-applied first insulating layer. Dual layer systems as represented by the foregoing references, of course, frequently fail because of the thermal stresses between the two layers. Moreover, they tend to be expensive to install and repair. Special anchoring systems are sometimes necessary for satisfactory installation of these.

In U.S. Pat. No. 4,490,334 there is described the use of curved ribs and mesh to hold a ceramic fiber blanket in place in a domed portion of a cylindrical reactor. Use of a ceramic fiber blanket in this application is practical only because the fiber blanket is not exposed to erosive fluidized solids which would otherwise quickly destroy the blanket.

Since there has been a trend toward conducting petrochemical processes at ever more severe conditions than heretofore, further improvements in lining systems used in cold wall reactor vessels is even more important. Changing economic conditions and the necessity to increase productivity are additional factors driving the constant search for improved lining systems for reactor vessels.

Accordingly, it is an object of the present invention to provide an improved erosion-resistant ceramic insulating lining system for cold wall vessels which is heat resistant.

It is another object of the present invention to provide an improved erosion-resistant ceramic insulating lining for cold wall vessels that can be installed at lower cost than other lining systems.

These and other objects of the present invention will be apparent from a reading of the description which follows.

SUMMARY OF THE INVENTION

Simply stated, the present invention contemplates the use of a flexible ceramic fiber insulating blanket which is impregnated with a material capable of stiffening the blanket and reducing erosion of the insulating blanket under conditions of use.

DETAILED DESCRIPTION OF THE INVENTION

Figure 1:
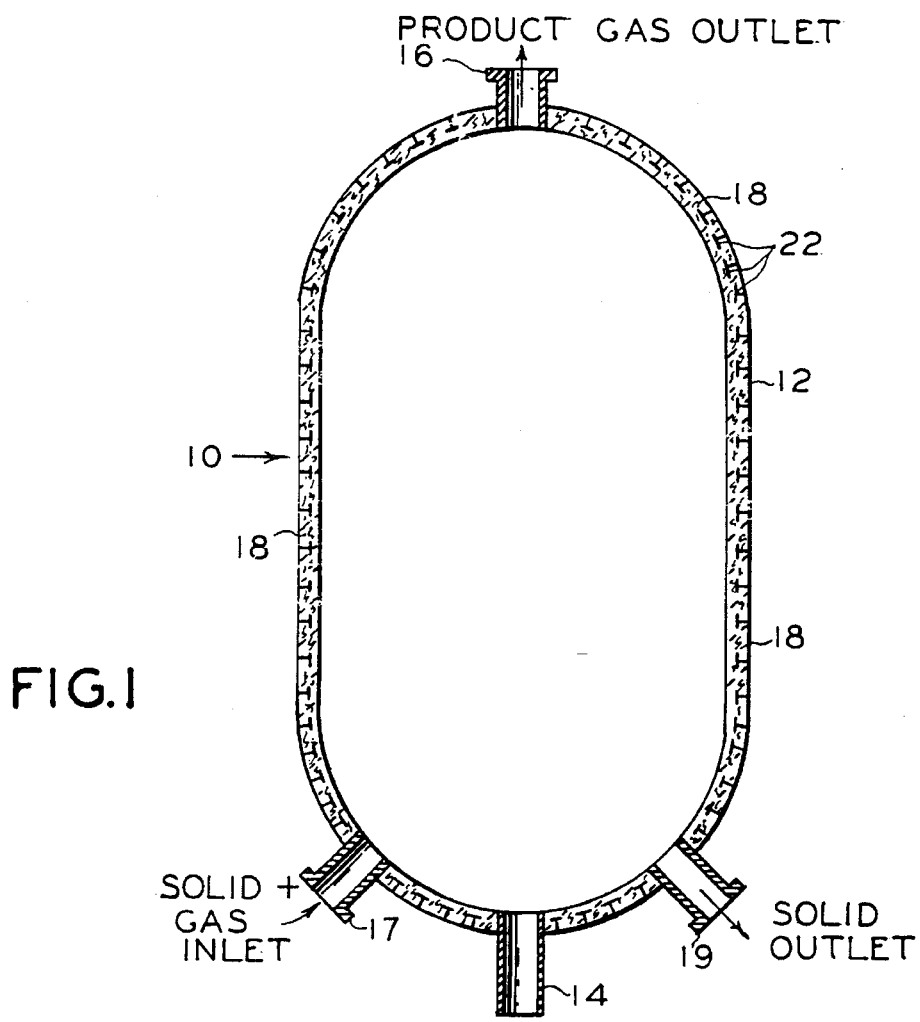
FIG. 1 is a vertical cross-sectional view of the reaction vessel employing the ceramic fiber insulating lining system of the present invention.

Referring now to the drawings and, in particular, to FIG. 1, there is shown a process vessel 10 which includes an outer metal shell 12 having gas inlet and outlet openings 14 and 16, respectively, and a solids inlet and outlet 17 and 19, respectively. Perforated plates or grids 15 (not shown) may be horizontally disposed within vessel 10 to support one or more beds of fluidized particulate solid material such as fluidized catalysts. The vessel 10 also may contain cyclones (not shown) for separation of solids from product gas streams.

Fastened to the inner wall of the metal shell 12, for example, by welding, are a plurality of metal anchor members 22 on which to tie back the insulating layer 18 of the present invention.

The insulating layer 18 of the present invention consists of a high density ceramic fiber insulating blanket which is impregnated with a material capable of stiffening the fiber insulating blanket and protecting it against erosion. In general, the insulating blanket will have a density in the range of about 6 to 25 pounds per cubic foot, and preferably in the range of 12 to 25 pounds per cubic foot. In general, the fibers are in the range of about 2 to 3 μm in diameter and from 2 to 10 inches long, and are compressed or formed into a predetermined shape.

Among the ceramic fiber materials useful in the practice of the present invention are alumina-silicate fibers. Typically useful materials have alumina to silica weight ratios of from about 90 alumina to 10 silica to about 20 alumina to 80 silica.

An example of an alumina-silicate ceramic fiber insulation material formed as a modular panel is the alumina-silicate product sold under the Trademark Pyro-Bloc by Thermal Ceramics, Augusta, Ga.

It is a particularly important feature of the present invention that the ceramic fiber insulating blanket be impregnated with material which is capable of stiffening the ceramic fiber insulating blanket and protecting it against erosion under conditions of use. Particularly preferred agents for impregnating the insulating blanket include sodium silicate, potassium silicate, silica and mixtures thereof. In order to impregnate the insulating blanket with the agent, the agent is best used as aqueous dispersions or colloidal sols and injected into the blanket at a plurality of points to assure substantially uniform distribution of the agent within the blanket. The agents may be injected into the blanket before or after the insulation system is installed on the vessel wall. The amount of agent used will be that sufficient to render the insulating blanket rigid. In general, sufficient agent is used to provide from about 0.1 to about 10 pounds of agent per cubic foot of ceramic fiber material and preferably from about 2 pounds to about 6 pounds per cubic foot of fiber. Since the agent is best applied as a liquid dispersion containing about 40 percent solids, the amount of dispersion used preferably is such that from about 5 to about 15 pounds of dispersion is absorbed per cubic foot of ceramic fiber. After injecting the liquid agent into the insulating blanket material, the blanket material can be dried by any convenient means. Indeed, it is most convenient and practical to allow the material to dry out during the initial start-up of a vessel in which it is installed.

Optionally and preferably, the rigidizing agent is modified with a wetting and dispersing agent such as potassium and sodium sulfates, phosphates and mixtures thereof. In general, from about 0.01 weight percent to about 5.0 weight percent, and preferably from about 0.5 to 1.0 weight percent, of a wetting and dispersing agent is added to the rigidizing agent prior to its application to the ceramic fibers.

Impregnating the ceramic fiber blanket with rigidizing agent, as described above, results in an insulating material which has a cross-section substantially similar to a castable refractory material. Importantly, the rigidizing agent is dispersed within the fiber structure, thereby acting as a bonding agent between the fibers and not merely a hard facing which may be prone to thermal-mechanical failure.

As should be appreciated, shaped panels or sections of ceramic fiber blanket material can be impregnated with the rigidizing agent, thereby providing ceramic insulation modules. Typically, such ceramic fiber insulation modules will range in size from about 1 to about 4 square feet, and have thickness in the range of about 2 inches to about 8 inches.

Figure 2:
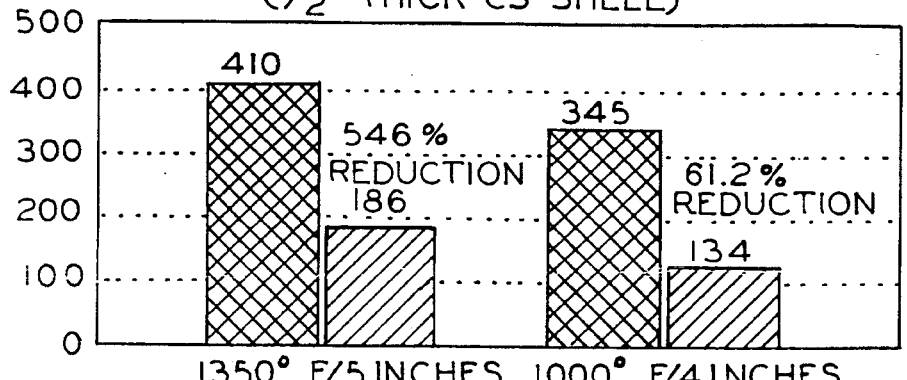
FIG. 2 is a graphic representation of a comparison of the insulating properties of the lining of the present invention compared with a castable refractory lining.

The insulating capability of a ceramic fiber insulating module having a fiber density of 12 pounds per cubic foot and impregnated with 12 pounds of aqueous colloidal silica rigidizing agent per cubic foot of ceramic fiber was compared with the thermal insulating property of a typical castable refractory lining using the hot wire technique, JISR2618-1979 of the Japan Standards Association. The ceramic fiber with agent was found to be about 65 percent lower in thermal conductivity than a typical castable refractory material. The reduced heat losses associated with reduced thermal conductivity are shown graphically in FIG. 2. Basically, they demonstrate that the insulating material of the present invention shows a fifty to sixty percent reduction in heat loss when compared with an equivalent thickness of a typical castable refractory lining material.

Laboratory tests have also demonstrated that the ceramic fiber impregnated with the same concentration of colloidal silica rigidizing agent as stated above had an erosion resistance comparable to a conventional vessel lining castable. This was determined by ASTM C704 erosion tests in which the quantity of SiC grit was reduced to 125 grams. In identical tests, the ceramic fiber material, without rigidizing agent, was completely destroyed.

Laboratory tests have additionally shown that fiber shrinkage can be effectively controlled with fiber compression and injection techniques. These techniques eliminated shrinkage gaps and cracking which formed in earlier test panels.

In a field test, sections of ceramic fiber insulating blanket impregnated with agent, as described above, were installed in a fluid catalytic cracking vessel where they were exposed to erosive solids and hot gases. The test sections were inspected after approximately 8 months of operation when the unit was shut down. No significant cracking or erosion was found at that time. Shell temperatures during subsequent operation indicate that the test sections continue to perform well after approximately 6 additional months of operation.

The modular design of the insulating material of the present invention is easily installed, and, of course, does not require curing and dry-out as castable lining systems require. Moreover, special equipment is not required to install the ceramic fiber lining system of the present invention.

While specific embodiments of the invention have been shown and described in detail to illustrate the application of the inventive principles herein, it will be understood that the invention may be embodied or practiced otherwise without departing from such principles. In particular, while applicants have chosen to illustrate the invention in the environment of a process vessel, those skilled in the art will readily appreciate that the invention may be practiced in other environments, such as circulation and overhead lines, where it is necessary to provide an insulating layer adjacent to a metal surface in order to protect the metal surfaces from high temperature and erosion or corrosive materials that would otherwise contact the metal surface.

What is claimed is:

1. In a reactor vessel for gas-solids contacting, the reactor vessel having internal walls with insulation fastened thereto, the improvement wherein said insulation comprises an alumina-silicate ceramic fiber blanket material and an agent selected from the group consisting of sodium silicate, potassium silicate and colloidal silica and mixtures thereof substantially uniformly distributed in the ceramic fiber material by the vehicle of an aqueous dispersion or colloidal sol in amounts sufficient to stiffen the fiber material and reduce erosion of the blanket under conditions of use wherein the aqueous dispersion or colloidal sol contains from about 0.01 to about 5 weight percent of a wetting agent selected from the group consisting of sodium and potassium sulfates, phosphates and mixtures thereof.

2. The improvement of claim 1 wherein said ceramic fiber material has a density in the range of from about 6 to about 25 pounds per cubic foot.

3. The improvement of claim 2 wherein said alumina-silicate fiber has a ratio of alumina to silica of from about 90 to 10 to about 20 to 80.

4. The improvement of claim 3 wherein said fiber has a density of from about 12 to about 25 pounds per cubic foot.

5. The improvement of claim 4 wherein said ceramic fiber material is impregnated with from about 0.1 to about 10 pounds of said agent per cubic foot of ceramic fiber.

6. The improvement of claim 5 wherein said ceramic fiber material is impregnated with from about 2 to about 6 pounds of said agent per cubic foot of ceramic fiber.

7. An improved insulating lining for reactor vessels of the cold wall type comprising an alumina-silicate ceramic fiber material having a density of from about 6 to about 25 pounds per cubic foot and an agent selected from sodium silicate, potassium silicate, colloidal silica and mixtures thereof substantially uniformly distributed in the ceramic fiber material by the vehicle of an aqueous dispersion or colloidal sol in an amount ranging between about 0.1 to about 10 pounds per cubic foot of said fiber whereby said agent stiffens said fiber material and reduces erosion of said fiber material under conditions of use wherein the aqueous dispersion or colloidal sol contains from about 0.01 to about 5 weight percent of a wetting agent selected from the group consisting of sodium and potassium sulfates, phosphates and mixtures thereof.

8. A method for stiffening an alumina-silicate ceramic fiber insulating blanket and improving its erosion resistance comprising:

injecting the blanket with an aqueous dispersion or colloidal sol of an agent selected from sodium silicate, potassium silicate, colloidal silica and mixtures thereof in an amount sufficient to provide a substantially uniform distribution of the agent in the blanket, and drying the impregnated blanket whereby the blanket is stiffened and its erosion resistance is improved wherein the aqueous dispersion or colloidal sol contains from about 0.01 to about 5 weight percent of a wetting agent selected from the group consisting of sodium and potassium sulfates, phosphates and mixtures thereof.

9. The method of claim 8 wherein the amount of agent is from about 0.1 to about 10 pounds per cubic foot of fiber.

* * * * *